US012646231B2

(12) United States Patent
Jefferson et al.

(10) Patent No.: US 12,646,231 B2
(45) Date of Patent: Jun. 2, 2026

(54) IMAGE INPAINTING USING LOCAL CONTENT PRESERVATION

(71) Applicant: ADOBE INC., San Jose, CA (US)

(72) Inventors: Dana Michelle Jefferson, Astoria, NY (US); Benjamin Delarre, San Francisco, CA (US); Davis Taylor Brown, Seattle, WA (US); Michael Spencer Cragg, Troy, MI (US)

(73) Assignee: ADOBE INC., San Jose, CA (US)

( * ) Notice: Subject to any disclaimer, the term of this patent is extended or adjusted under 35 U.S.C. 154(b) by 107 days.

(21) Appl. No.: 18/511,230

(22) Filed: Nov. 16, 2023

(65) Prior Publication Data

US 2025/0022192 A1 Jan. 16, 2025

Related U.S. Application Data

(60) Provisional application No. 63/513,149, filed on Jul. 12, 2023.

(51) Int. Cl.
| | |
|---|---|
| *G06T 15/50* | (2011.01) |
| *G06T 5/50* | (2006.01) |
| *G06T 5/77* | (2024.01) |
| *G06T 11/23* | (2026.01) |
| *G06T 11/60* | (2006.01) |

(52) U.S. Cl.
CPC .............. *G06T 11/23* (2026.01); *G06T 5/50* (2013.01); *G06T 5/77* (2024.01); *G06T 11/60* (2013.01); *G06T 2207/20221* (2013.01)

(58) Field of Classification Search
CPC ..... G06T 11/203; G06T 11/206; G06T 17/30; G06T 5/50; G06T 5/77; G06T 11/60; G06T 2207/20221; G06T 2200/24; G06F 17/17; G09G 5/20

USPC .......................................................... 345/422
See application file for complete search history.

(56) References Cited

U.S. PATENT DOCUMENTS

| | | | |
|---|---|---|---|
| 7,171,057 B1 * | 1/2007 | Wilensky | .............. G06T 15/503 382/284 |
| 11,734,570 B1 * | 8/2023 | Kurz | ...................... G06N 3/048 706/25 |
| 2006/0013501 A1 * | 1/2006 | Tamura | ...................... G06T 5/70 382/260 |

(Continued)

OTHER PUBLICATIONS

Office Action dated Jun. 30, 2025 in related U.S. Appl. No. 18/454,850.

(Continued)

*Primary Examiner* — Gordon G Liu
(74) *Attorney, Agent, or Firm* — F. CHAU & ASSOCIATES, LLC

(57) ABSTRACT

Methods, non-transitory computer readable media, apparatuses, and systems for image inpainting include obtaining, via a user interface, an input image and a local content preservation value and receiving a content generation selection. The content generation selection applies the local content preservation value to at least one pixel of the input image. An image generation model then generates an output image based on the input image and the content generation selection. The output image includes synthetic content in a region specified by the content generation selection, and a degree of adherence of the synthetic content to the input image is based on the local content preservation value.

19 Claims, 9 Drawing Sheets

(56) References Cited

U.S. PATENT DOCUMENTS

| | | | |
|---|---|---|---|
| 2013/0182184 A1* | 7/2013 | Senlet | H04N 5/272 |
| | | | 348/586 |
| 2017/0103502 A1 | 4/2017 | Gilra | |
| 2019/0164003 A1* | 5/2019 | Abhishek | G06V 30/412 |
| 2020/0342576 A1 | 10/2020 | Lin et al. | |
| 2021/0150678 A1 | 5/2021 | Yi et al. | |
| 2021/0150681 A1 | 5/2021 | Sytnik | |
| 2022/0156893 A1 | 5/2022 | Zhou et al. | |
| 2022/0309623 A1 | 9/2022 | Wu et al. | |
| 2022/0366544 A1 | 11/2022 | Kudelski et al. | |
| 2023/0103638 A1 | 4/2023 | Saharia et al. | |
| 2023/0281955 A1* | 9/2023 | Ackerson | G06T 17/00 |
| | | | 382/274 |
| 2024/0249422 A1 | 7/2024 | Jampani et al. | |
| 2024/0295953 A1* | 9/2024 | Zakharov | G06V 10/82 |
| 2024/0331235 A1 | 10/2024 | Smock et al. | |
| 2024/0428481 A1 | 12/2024 | Rami Koujan et al. | |
| 2025/0029297 A1 | 1/2025 | Stenger et al. | |

OTHER PUBLICATIONS

Office Action dated Dec. 3, 2025 in related U.S. Appl. No. 18/454,850.
Notice of Allowance dated Apr. 7, 2026 in related U.S. Appl. No. 18/454,850.

* cited by examiner

Output image

Input image, prompt,
and user inputs

Provide an input image, a prompt, and user inputs — 205

*Prompt*

Generate an output image by inpainting content described by the prompt according to the user inputs — 210

Provide the output image to the user — 215

— 200

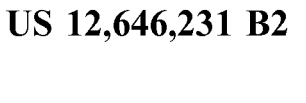

Settings

Match shape
Match the image to your selection's shape.

freeform   Conform

Preserve content
Choose how much of the original content will be kept in the generated image Original ———————○——— New

Guidance strength
Determine how closely the generated content keeps to the Prompt.

Original image ○———————— Prompt

Brush size          99%
Brush hardness      38%
Brush opacity       64%

Add   Subtract   Settings   Background   Invert

Clear

Describe the image you want to generate or leave this blank

Generate

FIG. 5

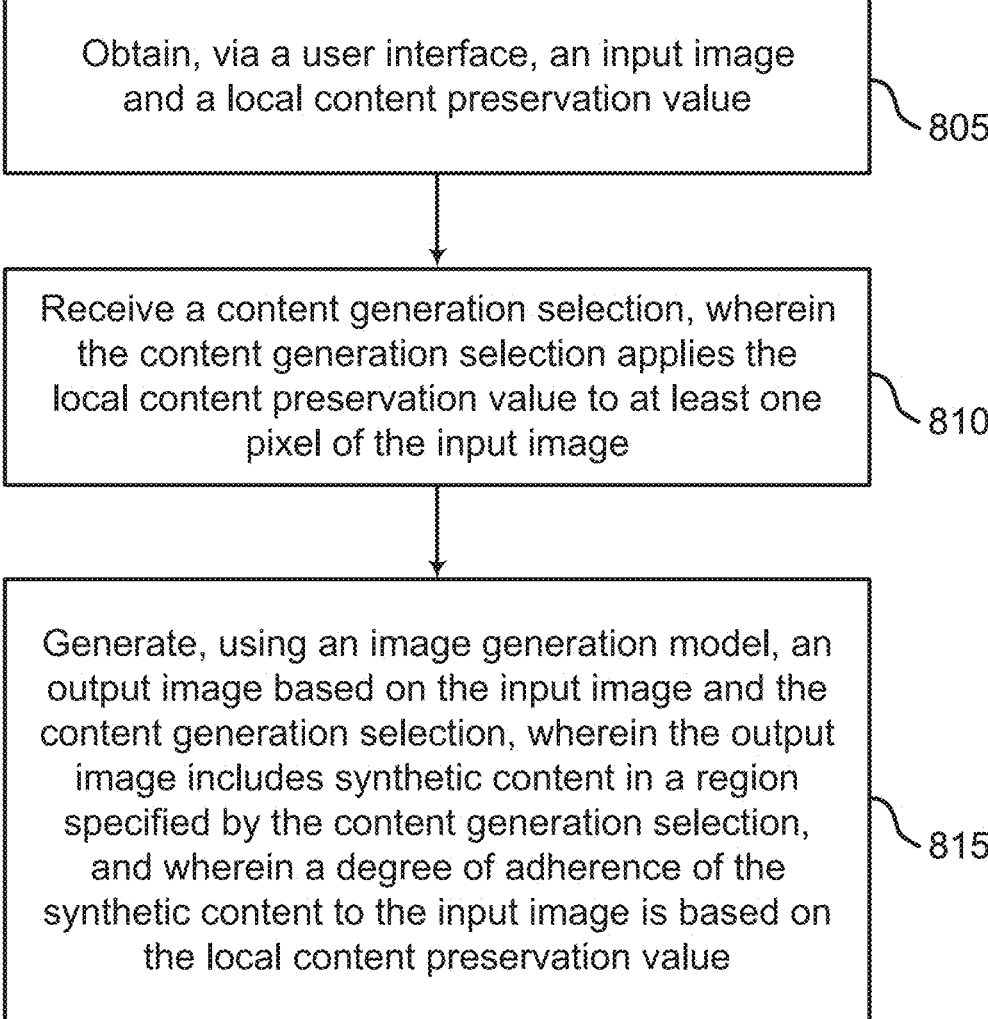

Obtain, via a user interface, an input image
and a local content preservation value

805

Receive a content generation selection, wherein
the content generation selection applies the
local content preservation value to at least one
pixel of the input image

810

Generate, using an image generation model, an
output image based on the input image and the
content generation selection, wherein the output
image includes synthetic content in a region
specified by the content generation selection,
and wherein a degree of adherence of the
synthetic content to the input image is based on
the local content preservation value

Figure 9:
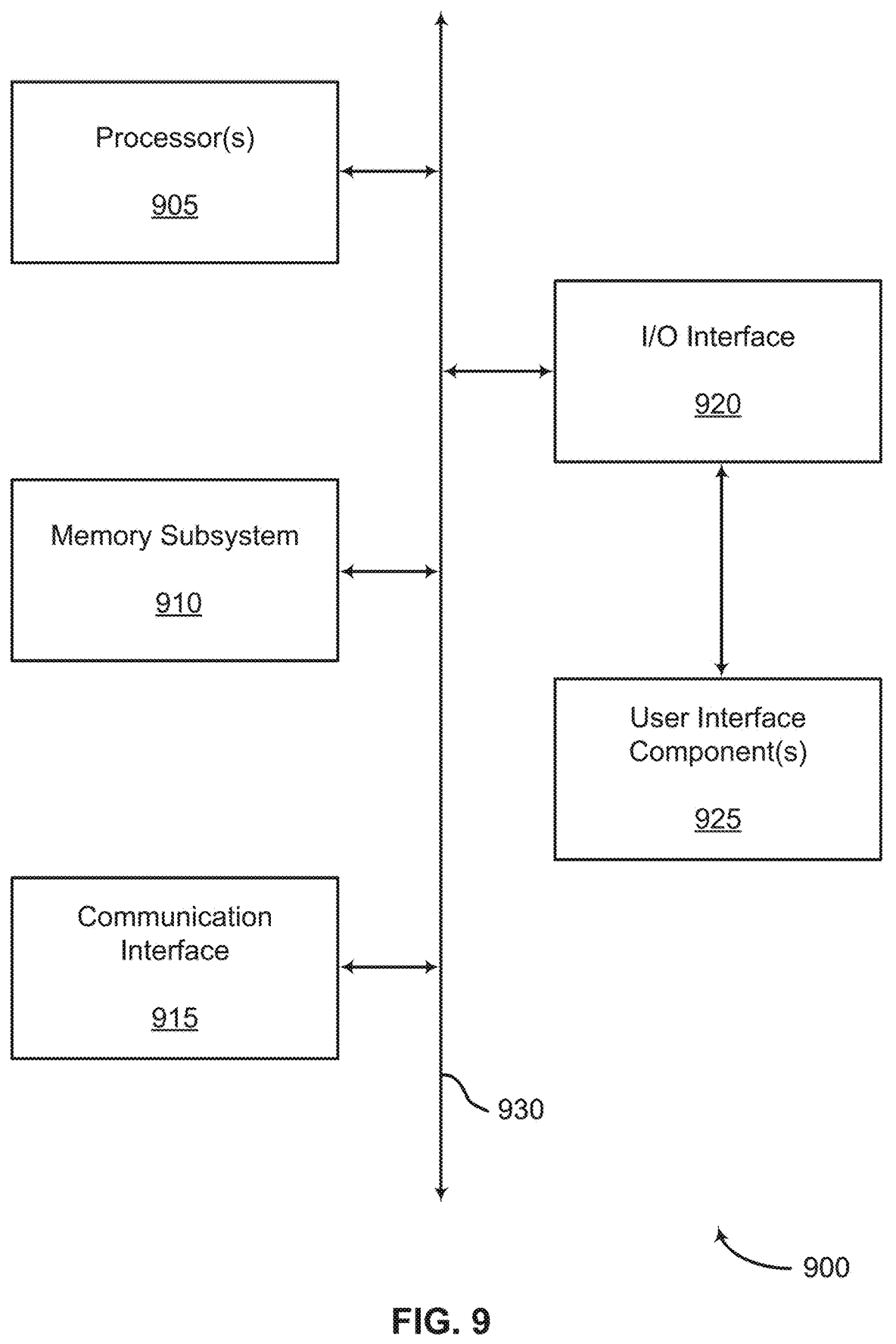

Processor(s)

905

I/O Interface

920

Memory Subsystem

910

User Interface Component(s)

925

Communication Interface

IMAGE INPAINTING USING LOCAL CONTENT PRESERVATION

CROSS-REFERENCE TO RELATED APPLICATION

This application claims priority under 35 U.S.C. § 119 to U.S. Provisional Application No. 63/513,149, filed on Jul. 12, 2023, in the United States Patent and Trademark Office, the disclosure of which is incorporated by reference herein in its entirety.

BACKGROUND

The following relates generally to machine learning, and more specifically to machine learning for image generation. Machine learning is an information processing field in which algorithms or models such as artificial neural networks are trained to make predictive outputs in response to input data without being specifically programmed to do so. For example, a machine learning model can be used to generate an image based on input data, where the image is a prediction of what the machine learning model thinks the input data describes.

Machine learning techniques can be used to generate images according to multiple modalities. For example, a machine learning model can be trained to generate an image based on a text input or an image input, such that the content of the image is determined based on information included in the text input or the image input.

SUMMARY

Aspects of the present disclosure provide systems and methods for image generation. According to an aspect of the present disclosure, an image generation system generates an output image using an inpainting technique, where an image generation model inpaints content described in a prompt (such as a text prompt) in an area of an input image specified by a brush tool input. In some cases, the image generation model preserves some amount of content from the input image in the area specified by the brush tool input such that the inpainted content is naturally integrated with the input image in the output image. In some cases, the amount of content to be preserved from the input image is provided via a content preservation value that is applied via the brush tool input.

Accordingly, an image generation system according to the present disclosure provides a simplified image inpainting workflow for creating a mask having a variable intensity that indicates how much original content from an input image is to be preserved in a generated image, thereby providing for a more natural integration of generated content with the input image than conventional image generation systems can provide.

A method and non-transitory computer readable medium for image generation are described. One or more aspects of the method and non-transitory computer readable medium include obtaining, via a user interface, an input image and a local content preservation value; receiving a content generation selection, wherein the content generation selection applies the local content preservation value to at least one pixel of the input image; and generating, using an image generation model, an output image based on the input image and the content generation selection, wherein the output image includes synthetic content in a region specified by the content generation selection, and wherein a degree of adherence of the content to the input image is based on the local content preservation value.

A method and non-transitory computer readable medium for image generation are described. One or more aspects of the method and non-transitory computer readable medium include obtaining an input image; receiving a text prompt; receiving a local content preservation value from a user; receiving a content generation selection from the user, wherein the content generation selection applies the local content preservation value to at least one pixel of the input image; and generating, using an image generation model guided by the text prompt, an output image based on the input image, wherein the output image includes content based on the text prompt in a region specified by the content generation selection, and wherein a degree of adherence of the content to the input image is based on the local content preservation value.

A system and an apparatus for image generation are described. One or more aspects of the system and the apparatus include one or more processors; one or more memory components coupled with the one or more processors; a user interface displaying: a text input element configured to receive a text prompt, a local content preservation input element configured to receive a local content preservation value from a user, and a content generation brush tool configured to receive a content generation selection from the user, wherein the content generation selection applies the local content preservation value to at least one pixel of an input image; and an image generation model configured to generate, based on the text prompt, an output image based on the input image, wherein the output image includes content based on the text prompt in a region specified by the content generation selection, and wherein a degree of adherence of the content to the input image is based on the local content preservation value.

BRIEF DESCRIPTION OF THE DRAWINGS

FIG. 5 shows a second example of a user interface for image generation according to aspects of the present disclosure.

FIG. 8 shows an example of a method for generating an image according to aspects of the present disclosure.

FIG. 9 shows an example of a computing device according to aspects of the present disclosure.

DETAILED DESCRIPTION

Figure 1:
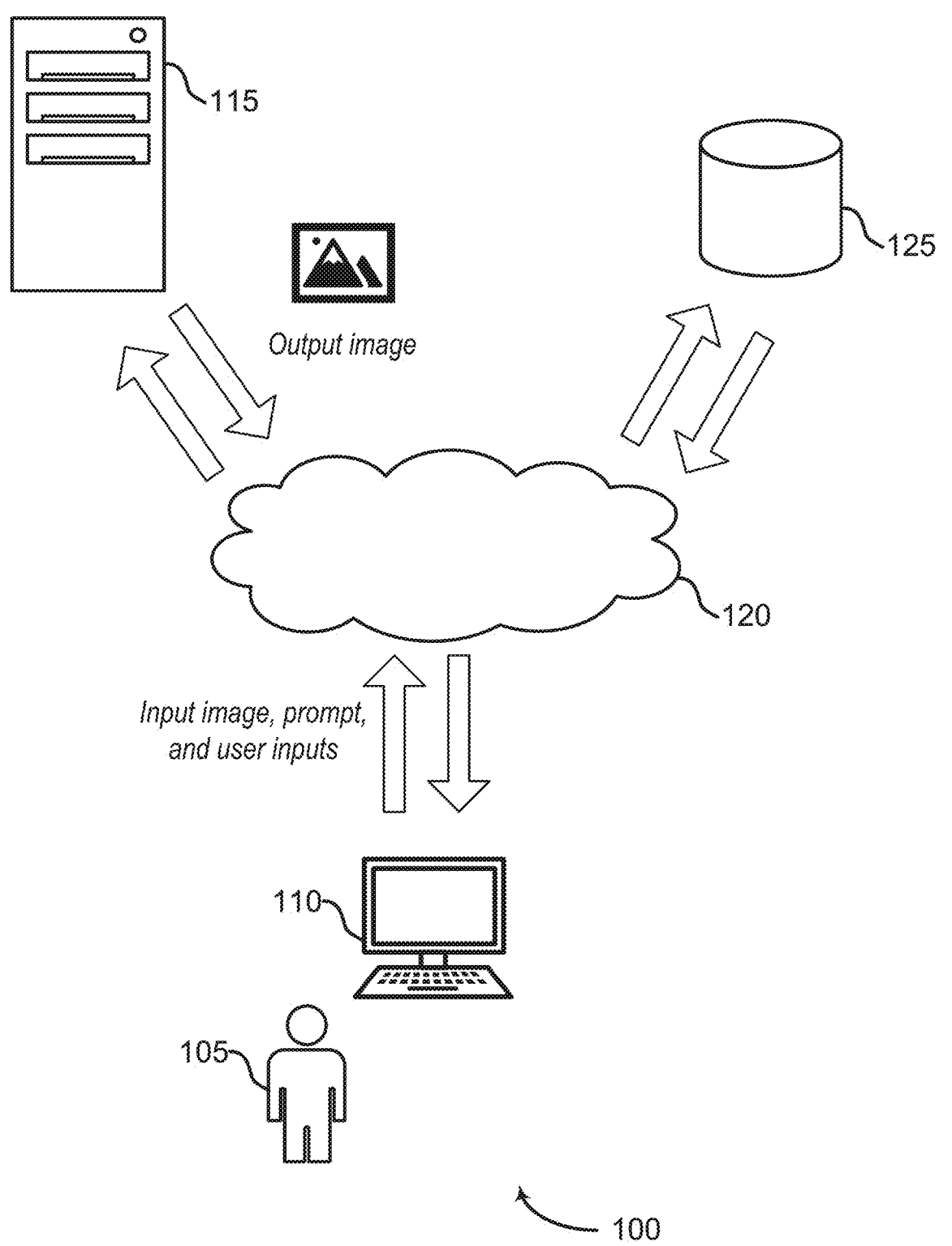
FIG. 1 shows an example of an image generation system according to aspects of the present disclosure.

Machine learning techniques can be used to generate images according to multiple modalities. For example, a machine learning model can be trained to generate an image based on a text input or an image input, such that the content of the image is determined based on information included in the text input or the image input. In an example, an image generation model can generate an output image by inpainting content described by a prompt into a masked region of an input image.

However, conventional workflows for preserving content (such as structures, styles, and colors) inside the masked region are lengthy and complicated, and are not suited for non-expert users. For example, masks used in conventional inpainting models are usually hard and binary, and users tend to replace all of the content inside the masked region. However, users may also want to preserve content (such as structures, styles, and colors) within the masked regions, which is technically challenging to achieve. Conventional image generation systems lack a simplified workflow or tool for content preservation during an image inpainting process.

According to some aspects, an image generation system provides a user with an intuitive user interface for applying a mask to an input image, where an image generation model inpaints synthetic content in the masked region, and where values for applying the mask or for describing the synthetic content (such as a brush size, a mask hardness, a mask opacity, a content preservation value of the mask, a prompt guidance value for the mask, or a combination thereof) are straightforwardly and efficiently received via the user interface.

In some cases, using variable intensity controls displayed by the user interface, the user can achieve a more natural integration of synthetic content with content from the input image. For example, by employing a feathered selection with a slight opacity over a jungle scenery, a user can make a tiger appear as if it is emerging from leaves in a natural manner (such as by depicting correct lighting, shadowing, proportional size of objects, directional consistency of objects, correct physical interaction of boundaries of objects, etc.). According to some aspects, the image generation system therefore revolutionizes a user's ability to inpaint objects, allowing for a more immersive and visually appealing image generation user experience.

According to an aspect of the present disclosure, an image generation system generates an output image using an inpainting technique, where an image generation model inpaints content described in a prompt (such as a text prompt) in an area of an input image specified by a brush tool input. In some cases, the image generation model preserves some amount of content from the input image in the area specified by a brush tool input such that the inpainted content is naturally integrated with the input image in the output image. In some cases, the amount of content to be preserved from the input image is provided via a content preservation value that is applied via the brush tool input.

An example of the image generation system is used in an image inpainting context. For example, a user has an image of a jungle and wants to generate an image such that a tiger appears to be emerging from leaves of the jungle in a natural manner. The user provides the image of the jungle as well as a prompt (such as an image of a tiger or a text prompt "A tiger") to the image generation system via a user interface (such as a graphical user interface provided on a user device by the image generation system). The user provides a local content preservation value to a local content preservation element of the user interface, where the local content preservation value indicates a degree of content to be preserved from the image of the jungle in a masked region in which the tiger will be inpainted. The user applies a mask to the image of the jungle via a content generation selection by brushing at least one pixel of the image with a content generation brush tool of the user interface. The content generation selection applies the local content preservation value to the at least one pixel.

The image generation system generates an output image using an image generation model (such as a generative adversarial network (GAN), a diffusion model, etc.) based on the image of the jungle, the prompt, the local content preservation value, and the content generation selection. In some cases, the output image depicts the image of the jungle as well as a tiger in the region identified by the content generation selection, and the local content preservation value controls a degree to which the at least one pixel is "jungle-like" and "tiger-like". The user interface therefore allows the user to intuitively generate an image in which the tiger is realistically inpainted into the image of the jungle.

Figure 2:
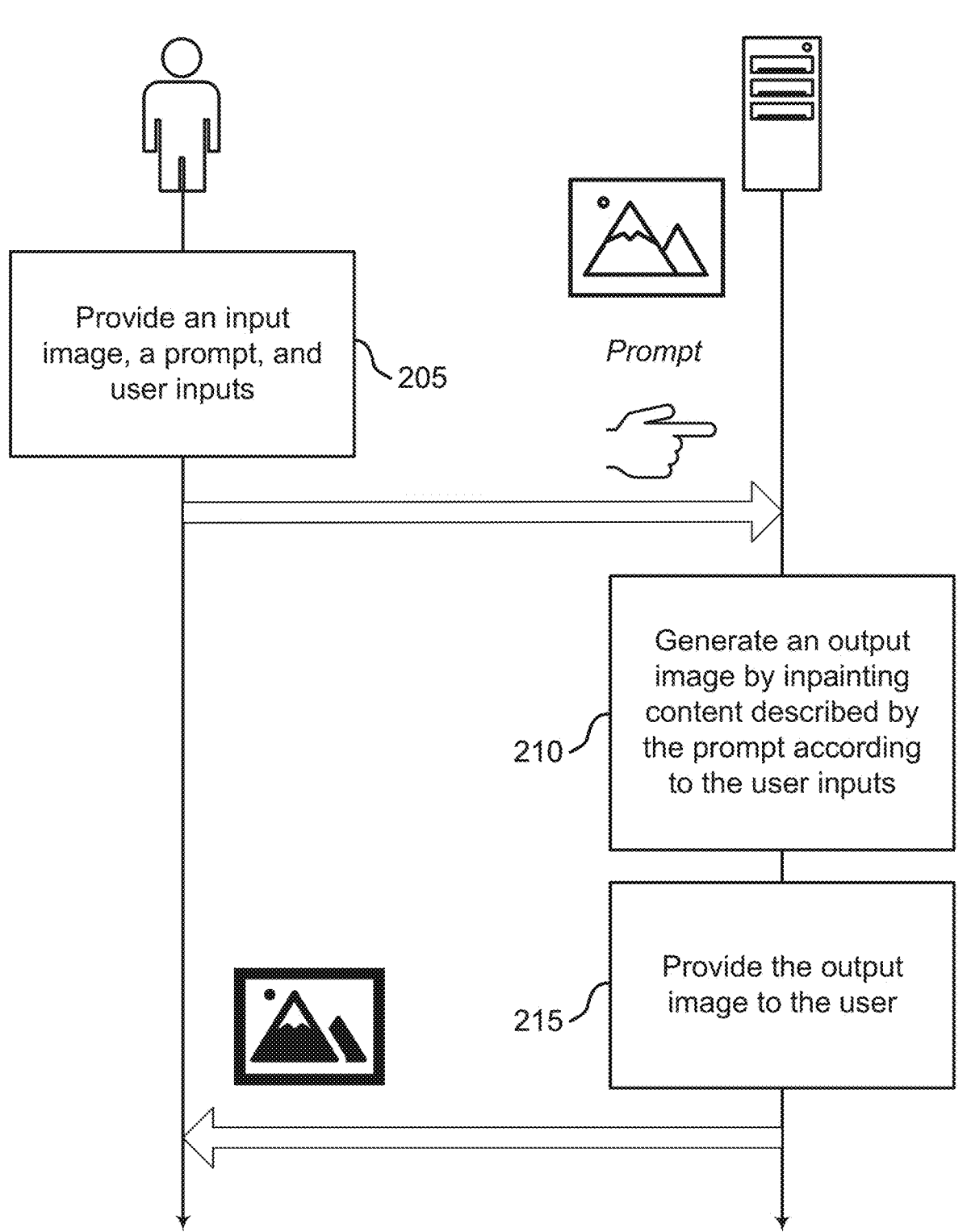
FIG. 2 shows an example of a method for image generation according to aspects of the present disclosure.

Further example applications of the present disclosure in the image compositing context are provided with reference to FIGS. 1-2. Details regarding the architecture of the image generation system are provided with reference to FIGS. 1, 3-7, and 9. Examples of a process for image generation are provided with reference to FIGS. 2 and 8.

Embodiments of the disclosure improve upon conventional image generation systems by providing a faster and more accurate technique for image inpainting. For example, conventional image generation models produce images with unwanted artifacts that result from inconsistencies between the generated content and the existing background or the text prompt. However, by receiving a content generation selection that indicates the degree of adherence of the synthetic content to the input image via the application of a content preservation value to portions of the input image and generating an output image including synthetic content that adheres to content of an input image to a variable degree, embodiments of the present disclosure allow a user (including a non-expert user) to control an image inpainting process in an efficient manner via an intuitive input. Further embodiments of the present disclosure generate the image based on additional guidance inputs, allowing the user to further customize the content of the output image in an intuitive manner.

Image Generation System

A system and an apparatus for image generation is described with reference to FIGS. 1-7 and 9. One or more aspects of the system and the apparatus include one or more processors; one or more memory components coupled with the one or more processors; a user interface displaying: a text input element configured to receive a text prompt, a local content preservation input element configured to receive a local content preservation value from a user, and a content generation brush tool configured to receive a content generation selection from the user, wherein the content generation selection applies the local content preservation value to at least one pixel of an input image; and an image generation model configured to generate, guided by the text prompt, an output image based on the input image, wherein the output image includes content based on the text prompt in a region specified by the content generation selection, and wherein a degree of adherence of the content to the input image is based on the local content preservation value.

In some cases, the user interface further displays a brush size input element configured to receive a brush size input, wherein the content generation selection is based at least in part on the brush size input. In some cases, the user interface further displays a brush hardness input element configured to receive a brush hardness input, wherein the content generation selection is based at least in part on the brush hardness input.

In some aspects, the local content preservation input element is further configured to receive an additional local content preservation value from the user. In some aspects, the content generation brush tool is further configured to receive an additional content generation selection from the user, wherein the additional content generation selection applies the additional local content preservation value to at least one additional pixel of the input image, and wherein the output image is further based on the additional content generation selection.

In some cases, the user interface further displays a global content preservation input element configured to receive a global content preservation value, wherein the output image is further based on the global content preservation value. In some cases, the user interface further displays a match shape input element configured to receive a match shape input, wherein a closeness of a match between the synthetic content of the output image and the content generation selection output is based on the match shape input.

In some cases, the user interface further displays a guidance strength input element configured to receive a guidance strength input, wherein a closeness of a match between the synthetic content of the output image and the text prompt is based on the guidance strength input.

In some cases, the user interface further displays an insert content input element configured to receive an insert content input, wherein the output image is based on the insert content input. In some cases, the user interface further displays a remove content input element configured to receive a remove content input, wherein the output image is based on the remove content input.

FIG. 1 shows an example of an image generation system 100 according to aspects of the present disclosure. The example shown includes user 105, user device 110, image generation apparatus 115, cloud 120, and database 125.

Referring to FIG. 1, user 105 provides an input image, a prompt (such as a text prompt, an image prompt, etc.) describing content, and user inputs (including a local content preservation value and a content generation selection) to image generation apparatus 115 via a user interface provided on user device 110 by image generation apparatus 115.

Image generation apparatus 115 generates an output image based on the input image, the prompt, and the user inputs using an image generation model (such as a GAN, a diffusion model, or other appropriate machine learning model). In some cases, the image generation model is guided by the prompt such that the output image includes, to some degree, synthetic content described by the prompt in a region designated by the content generation selection. In some cases, a degree of adherence of the content to the input image is based on the local content preservation value.

For example, in some cases, the local content preservation value represents a variable intensity, applied to the input image by the content generation selection, that indicates how much original content from the input image is to be preserved in the generated output image. Accordingly, in some cases, image generation apparatus 115 provides user control over a degree of natural integration of generated content with the content of the input image (e.g., the degree of adherence of the content) than conventional image generation systems can provide.

As used herein, in some cases, a "prompt" refers to information that is used to guide an image generation process implemented by the image generation model. As used herein, in some cases, "content" refers to any visual element (such as an object, entity, background, landscape, etc.) that is depicted in an image. As used herein, in some cases, "synthetic content" refers to content generated by an image generation model.

As used herein, in some cases, a "mask" refers to an image, image layer, or other suitable data (such as a scalable vector file) that is used to identify a portion, region, area, etc. of an image, where a masked region of the mask corresponds to the portion, etc. of the image and a non-masked region of the mask corresponds to the remaining portions, etc. of the image. In some cases, by superimposing the mask with the image or otherwise combining the mask with the image, a masked region of the image may therefore be distinguished from a non-masked region of the image.

As used herein, in some cases, a "band" or "banded region" refers to a group of one or more pixels from an inpainting mask, where one band is differentiated from another band by a different transparency of the pixels included in the respective bands.

As used herein, a "content preservation value" refers to a numeric representation of a degree of content that should be preserved in a generated image from at least one pixel of an input image. In some cases, a content preservation value is visually represented by a transparency of a pixel of a mask superimposed on the input image. In some cases, a content preservation value and a transparency value are inversely correlated (e.g., a nontransparent pixel including a transparency value of 0 corresponds to a content preservation value of 1, indicating that a maximum amount of content from the pixel is to be preserved in the generated image).

Image generation apparatus 115 provides the output image to the user via the user interface provided on user device 110. In some cases, the user interface displays the output image including the synthetic content at the location of the content generation selection.

According to some aspects, user device 110 is a personal computer, laptop computer, mainframe computer, palmtop computer, personal assistant, mobile device, or any other suitable processing apparatus. In some examples, user device 110 includes software that displays the user interface (e.g., a graphical user interface) provided by image generation apparatus 115. In some aspects, the user interface allows information (such as an image, a prompt, user inputs, etc.) to be communicated between user 105 and image generation apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

Image generation apparatus 115 is an example of, or includes aspects of, the corresponding element described with reference to FIGS. 6 and 9. According to some aspects, image generation apparatus 115 includes a computer-implemented network. In some embodiments, the computer-implemented network includes a machine learning model (such as the image generation model described with reference to FIG. 6). In some embodiments, image generation apparatus 115 also includes one or more processors, a memory subsystem, a communication interface, an I/O interface, one or more user interface components, and a bus as described with reference to FIG. 9. Additionally, in some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of image generation apparatus 115 is provided with reference to FIGS. 3-7 and 9. Further detail regarding a process for image generation is provided with reference to FIGS. 2 and 8.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet.

Some large cloud networks have functions distributed over multiple locations from central servers. A server is designated an edge server if it has a direct or close connection to a user. In some cases, cloud 120 is limited to a single organization. In other examples, cloud 120 is available to many organizations.

In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

FIG. 2 shows an example of a method 200 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, an aspect of the present disclosure is used in an image inpainting context. For example, a user uses an image generation system (such as the image generation system described with reference to FIG. 1) to inpaint content described by a prompt into an original image, where an inpainting location and degree of integration of the inpainted content and content from the original image is controlled by user inputs to a user interface provided by the image generation system.

At operation 205, a user provides an input image, a prompt, and user inputs to the image generation system. In some cases, the operations of this step refer to, or may be performed by, a user as described with reference to FIG. 1. For example, in some cases, the image generation system provides a user interface (such as a graphical user interface) on a user device (such as the user device described with reference to FIG. 1), and the user provides the input image, the prompt, and the user inputs to the image generation system via the user interface. Examples of a user interface are described with reference to FIGS. 3-7.

In some cases, the prompt is a text prompt including text. In some cases, the prompt is an image prompt including an image. In some cases, the prompt is provided in another modality that can describe content to be depicted in an image.

At operation 210, the system generates an output image by inpainting content described by the prompt according to the user inputs. In some cases, the operations of this step refer to, or may be performed by, an image generation apparatus as described with reference to FIGS. 1, 6, and 9. For example, the image generation apparatus generates the output image as described with reference to FIG. 8.

At operation 215, the system provides the output image to the user. In some cases, the operations of this step refer to, or may be performed by, an image generation apparatus as described with reference to FIGS. 1, 6, and 9. For example, in some cases, the image generation apparatus provides the image to the user via the user interface.

Figure 3:
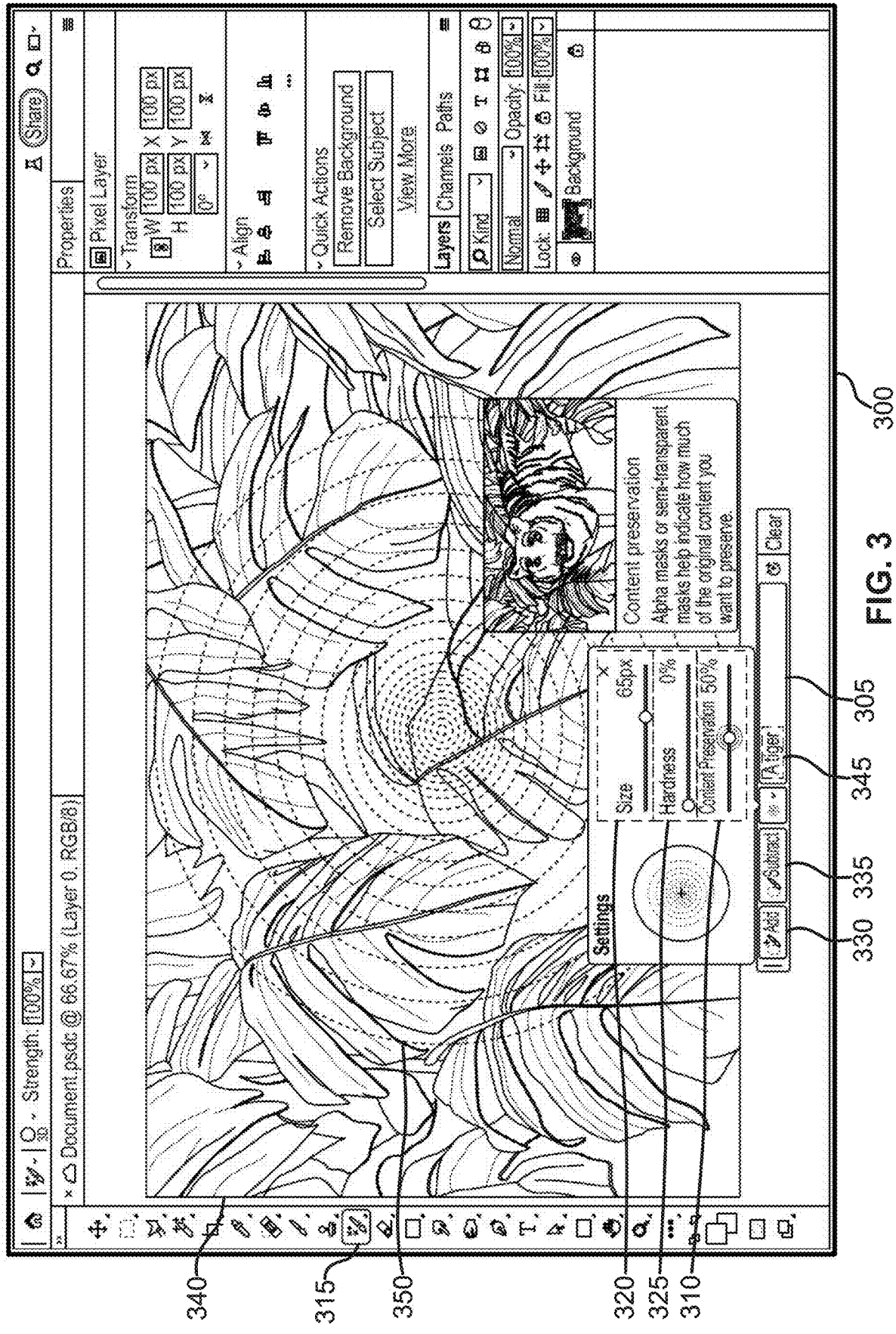
FIG. 3 shows a first example of a user interface for image generation according to aspects of the present disclosure.

FIG. 3 shows a first example of a user interface for image generation according to aspects of the present disclosure. The example shown includes user interface 300, input image 345, text prompt 350, and content generation selection 355.

User interface 300 is an example of, or includes aspects of, the corresponding element described with reference to FIGS. 4-7. In one aspect, user interface 300 includes text input element 305, local content preservation input element 310, content generation brush tool icon 315, brush size input element 320, brush hardness input element 325, insert content input element 330, remove content input element 335, and content generation selection representation element 340.

Referring to FIG. 3, a user (such as the user described with reference to FIG. 1) provides user inputs to various elements of user interface 300 to provide information for generating an output image. In some cases, user interface 300 is provided on a user device (such as the user device described with reference to FIG. 1) by an image generation apparatus (such as the image generation apparatus described with reference to FIGS. 1, 6, and 9).

For example, as shown in FIG. 3, the user provides text prompt 350 (e.g., "A tiger") to text input element 305. The user provides an input to content generation brush tool icon 315 to activate a content generation brush tool that allows the user to provide content generation selection 355 (shown in FIG. 3 for ease of illustration as an area including a set of dotted circles) as a brush tool input to input image 345 displayed by user interface 300. In some cases, content generation selection 355 is displayed in user interface 300 as an opaque (e.g., nontransparent), transparent (e.g., fully transparent), or semi-transparent mask displayed on input image 345. In some cases, content generation selection representation element 340 is a thumbnail representation of content generation selection 355 that includes a graphical representation of various values selected by the user with respect to the content generation selection (such as size, hardness, content preservation, etc.).

In some cases, the user can control an amount of content preserved within the area corresponding to content generation selection 350 via local content preservation input element 310. For example, in some cases, content generation selection 355 applies a content preservation value to each pixel of input image 345 selected by content generation selection 350, where the content preservation value corresponds to the local content preservation value selected using content preservation input element 310. In some cases, the content preservation value corresponds to a weight of an effect of text prompt 350 on an image generation process used to generate an output image, where a high local content preservation value corresponds to a low weight of text prompt 350, and vice versa. In some cases, a transparency of the semi-transparent area corresponds to the content preservation value (e.g., a high transparency represents a low content preservation value). In some cases, a user can provide multiple content generation selections, and each content generation selection corresponds to a different local content preservation value.

In some cases, the user can control a size of content generation selection 355 via brush size input element 320. For example, a larger brush size selected via brush size input element 320 corresponds to a larger number of pixels selected using content generation selection 355. In some cases, the user can control a hardness of the semi-transparent mask created by content generation selection 350 via brush hardness input element 325. For example, in some cases, a hardness of the semi-transparent mask corresponds to a number of banded regions of the semi-transparent mask, where each banded region has a different transparency from each other. In some cases, a number of banded regions in the semi-transparent mask corresponds to a number of iterations of the image generation process with respect to each banded region, which corresponds to a degree of blending of synthetic content generated during the image generation process with content included in input image 345.

In some cases, the user can select whether the image generation model operates in a content addition mode or a content subtraction mode by interacting with insert content input element 330 and remove content input element 335, respectively. For example, in some cases, in a content addition mode, synthetic content is added to input image 345 during the image generation process, while in a content subtraction mode, content is removed from input image 345 during the image generation process.

Text input element 305 is an example of, or includes aspects of, the corresponding element described with reference to FIGS. 4, 5, and 7. Local content preservation input element 310 is an example of, or includes aspects of, the corresponding element described with reference to FIG. 7. Content generation brush tool icon 315 is an example of, or includes aspects of, the corresponding element described with reference to FIG. 4. Brush size input element 320 is an example of, or includes aspects of, the corresponding element described with reference to FIGS. 5 and 7. Brush hardness input element 325 is an example of, or includes aspects of, the corresponding element described with reference to FIGS. 5 and 7. Insert content input element 330 is an example of, or includes aspects of, the corresponding element described with reference to FIGS. 5 and 7. Remove content input element 335 is an example of, or includes aspects of, the corresponding element described with reference to FIGS. 5 and 7.

Input image 345 is an example of, or includes aspects of, the corresponding element described with reference to FIG. 5. Text prompt 345 is an example of, or includes aspects of, the corresponding element described with reference to FIG. 4. Content generation selection 350 is an example of, or includes aspects of, the corresponding element described with reference to FIG. 5.

Figure 4:
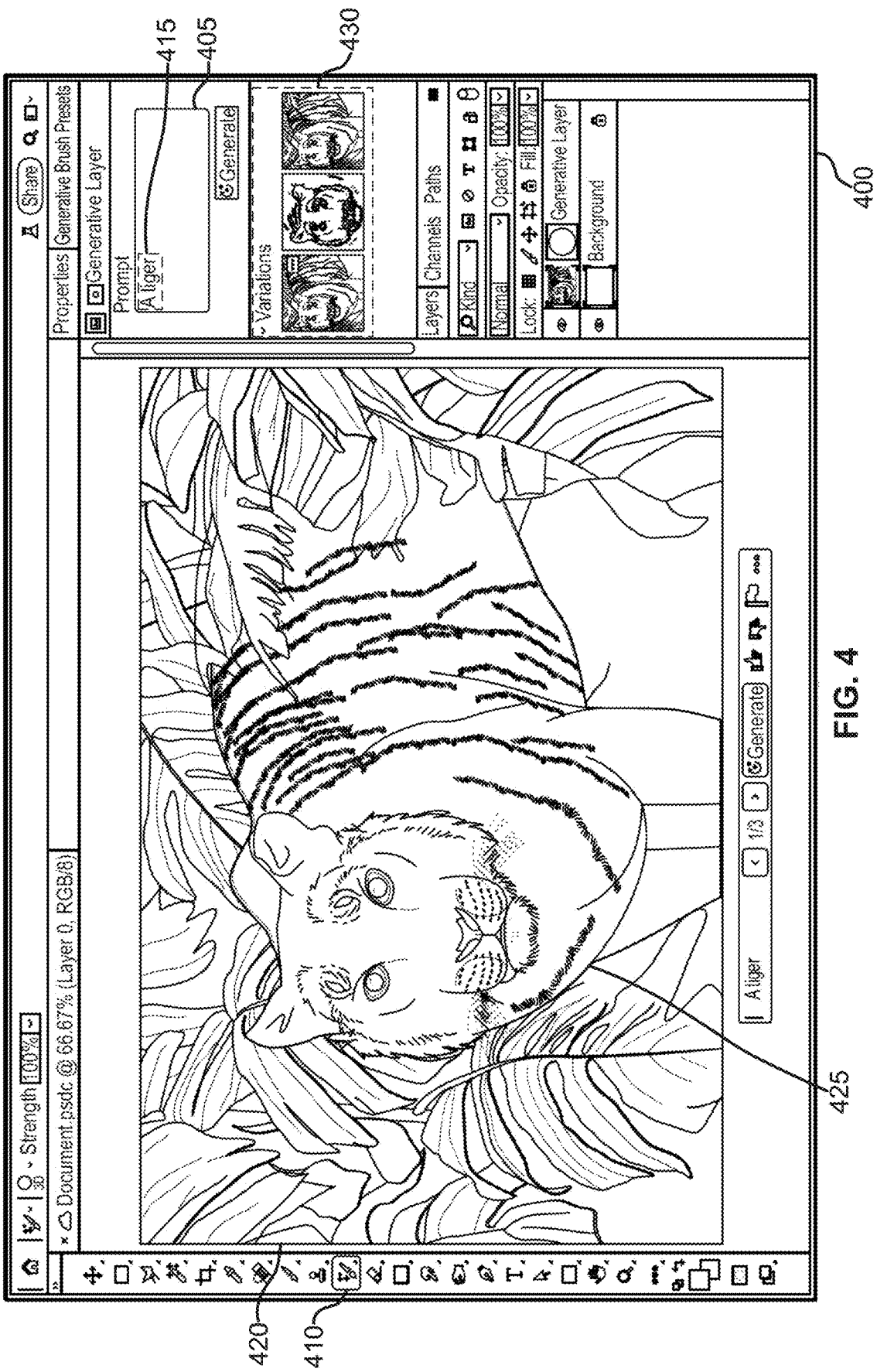
FIG. 4 shows an example of a user interface displaying an output image according to aspects of the present disclosure.

FIG. 4 shows an example of a user interface displaying an output image according to aspects of the present disclosure. The example shown includes user interface 400, text prompt 415, output image 420, synthetic content 425, and preview 430 of variations of output image 420.

User interface 400 is an example of, or includes aspects of, the corresponding element described with reference to FIGS. 3 and 5-7. In one aspect, user interface 400 includes text input element 405 and content generation brush tool 410.

Referring to FIG. 4, user interface 400 displays output image 420 including synthetic content 425 generated based on text prompt 415. As shown in FIG. 4, synthetic content 425 is integrated in a realistic manner with the content shown in the input image shown in FIG. 3. For example, a tiger appears to emerge from leaves depicted in the input image in a realistic manner (e.g., with consistent lighting, shadows, content blending, spatial orientation, proportion, object boundaries and occlusion, etc.). In some cases, a user can provide a different text prompt to text input element 405 and generate a new output image based on the different text prompt.

As shown in FIG. 4, user interface 400 also displays preview 430 of variations of output image 420. In some cases, preview 430 includes a representation of each variation of output image 420, where each variation of output image 420 is generated based on the input image and inputs described with reference to FIG. 3. In some cases, a representation in preview 430 can be selected to view an enlarged representation of the corresponding variation.

Text input element 405 is an example of, or includes aspects of, the corresponding element described with reference to FIGS. 3, 5, and 7. Content generation brush tool icon 410 is an example of, or includes aspects of, the corresponding element described with reference to FIG. 3. Text prompt 415 is an example of, or includes aspects of, the corresponding element described with reference to FIG. 3.

FIG. 5 shows a second example of a user interface for image generation according to aspects of the present disclosure. The example shown includes user interface 500, input image 550, and content generation selection 555.

User interface 500 is an example of, or includes aspects of, the corresponding element described with reference to FIGS. 3-4 and 6-7. In one aspect, user interface 500 includes text input element 505, brush size input element 510, brush hardness input element 515, brush opacity element 520, global content preservation element 525, match shape input element 530, guidance strength input element 535, insert content input element 540, and remove content input element 545.

In the example of FIG. 5, a user (such as the user described with reference to FIG. 1) can provide user inputs to various elements of user interface 500 to control an image generation process in which content described by a text prompt provided via text input element 505 is inpainted in a region of input image 550 designated by content generation selection 555 (depicted as a semi-transparent area).

For example, in some cases, the user can control whether content generation selection 555 conforms to an object depicted in input image 550 via match shape input element 525. In some cases, match shape input element 525 controls a degree to which synthetic content included in an output image conforms to a shape of content generation selection 555.

In some cases, global content preservation element 525 is used to establish a baseline content preservation value for each content generation selection, where each content generation selection corresponds to a local content preservation value that is equal to or different than the baseline content preservation value. For example, a user can indicate the baseline content preservation value via the slider of global content preservation element 525 (where a slider position towards, for example, "New" indicates a low baseline content preservation value and a slider position towards "Original" indicates a high baseline content preservation value), and can provide one or more content generation selections via the user interface.

Each of the content generation selections corresponds to a local content preservation value that is equal to or different than the baseline content preservation value, such that at least a baseline amount or degree of content from the input image is preserved in a region of the output image corresponding to the one or more content generation selections. As shown in FIG. 5, each local content preservation value can be set using brush opacity element 520. In some cases, as described with reference to FIG. 3, a degree of transparency (e.g., opacity) of semi-transparent regions displayed in user interface 500 corresponds to a degree to which synthetic content included in the output image corresponds to the text prompt or to the input image.

In some cases, the user can determine how a degree to which a visual appearance of the synthetic content to be included in the output image is based on the prompt via guidance strength input element 535.

Text input element 505 is an example of, or includes aspects of, the corresponding element described with reference to FIGS. 3, 4, and 7. Brush size input element 510 is an example of, or includes aspects of, the corresponding element described with reference to FIGS. 3 and 7. Brush hardness input element 515 is an example of, or includes aspects of, the corresponding element described with reference to FIGS. 3 and 7. Match shape input element 530 is an example of, or includes aspects of, the corresponding element described with reference to FIG. 7. Guidance strength input element 535 is an example of, or includes aspects of, the corresponding element described with reference to FIG. 7. Insert content input element 540 is an example of, or includes aspects of, the corresponding element described with reference to FIGS. 3 and 7. Remove content input element 545 is an example of, or includes aspects of, the corresponding element described with reference to FIGS. 3 and 7.

Input image 550 is an example of, or includes aspects of, the corresponding element described with reference to FIG. 3. Content generation selection 555 is an example of, or includes aspects of, the corresponding element described with reference to FIG. 3.

Figure 6:
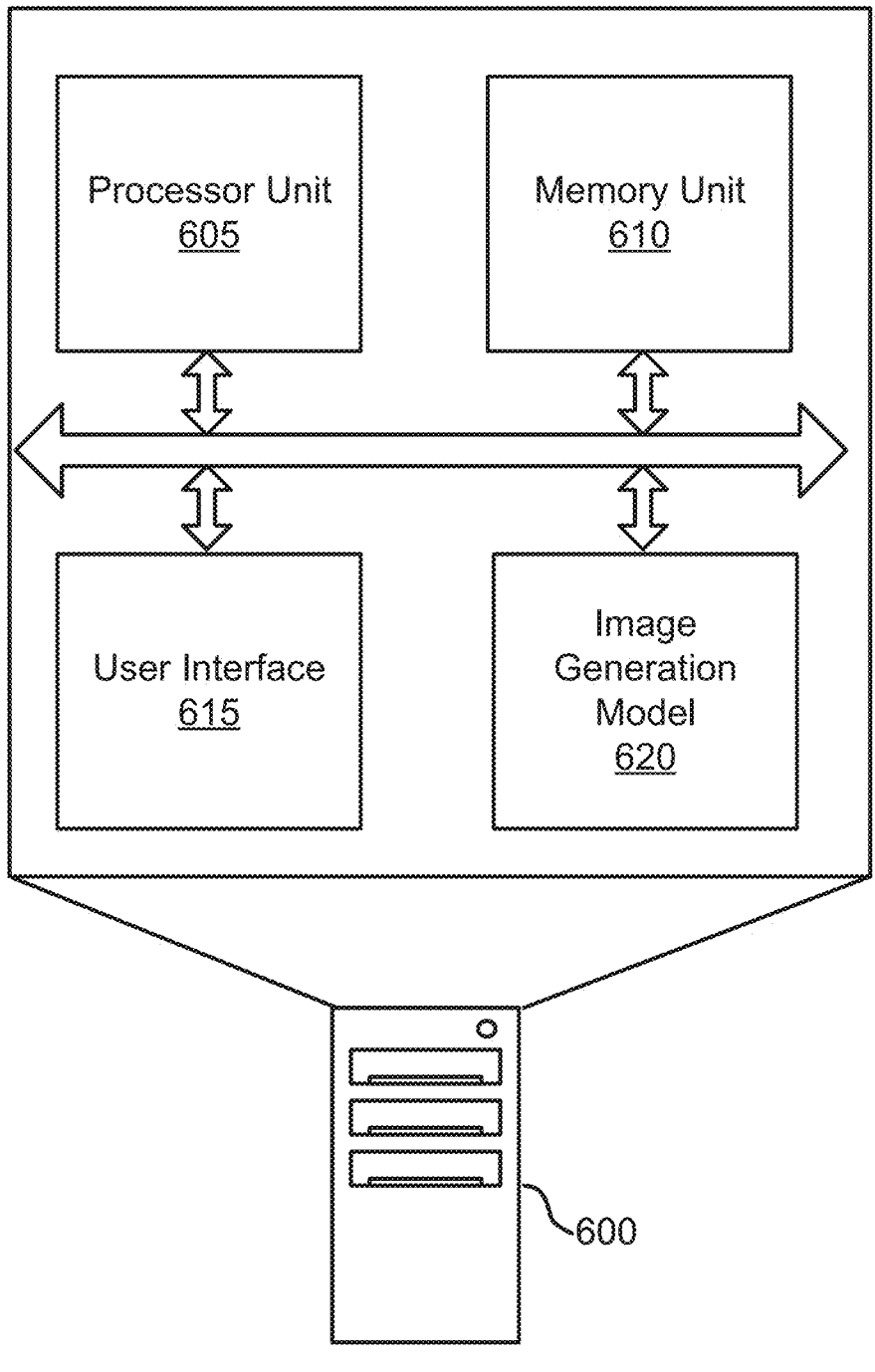
FIG. 6 shows an example of an image generation apparatus according to aspects of the present disclosure.

FIG. 6 shows an example of an image generation apparatus 600 according to aspects of the present disclosure. Image generation apparatus 600 is an example of, or includes aspects of, the corresponding element described with reference to FIG. 1. In one aspect, image generation apparatus 600 includes processor unit 605, memory unit 610, user interface 615, and image generation model 620.

Processor unit 605 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 605 is configured to operate a memory array using a memory controller. In other cases, a memory controller is integrated into processor unit 605. In some cases, processor unit 605 is configured to execute computer-readable instructions stored in memory unit 610 to perform various functions. In some aspects, processor unit 605 includes special purpose components for modem processing, baseband processing, digital signal processing, or transmission processing. According to some aspects, processor unit 605 comprises the one or more processors described with reference to FIG. 9.

Memory unit 610 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 605 to perform various functions described herein.

In some cases, memory unit 610 includes a basic input/output system (BIOS) that controls basic hardware or software operations, such as an interaction with peripheral components or devices. In some cases, memory unit 610 includes a memory controller that operates memory cells of memory unit 610. For example, the memory controller may include a row decoder, column decoder, or both. In some cases, memory cells within memory unit 610 store information in the form of a logical state. According to some aspects, memory unit 610 comprises the memory subsystem described with reference to FIG. 9.

According to some aspects, image generation apparatus 600 uses at least one processor included in processor unit 605 to execute instructions stored in at least one memory device included in memory unit 610 to perform operations.

For example, according to some aspects, image generation apparatus 600 obtains an input image. In some examples, image generation apparatus 600 combines a local content preservation value and a global content preservation value to obtain a combined content preservation value for at least one pixel, where an output image is based on the combined content preservation value. In some examples, image generation apparatus 600 saves a content generation selection as metadata in an image layer of the output image.

In some examples, image generation apparatus 600 displays a preview of each of a set of variations of the output image to a user. In some examples, image generation apparatus 600 receives a selection input indicating the output image from among the set of variations. In some examples, image generation apparatus 600 displays a content generation selection overlay depicting the content generation selection overlapping the input image, where a transparency value of the content generation selection overlay is based on a local content preservation value.

User interface 615 is an example of, or includes aspects of, the corresponding element described with reference to FIGS. 3-5, and 7. According to some aspects, user interface 615 is implemented as software stored in memory unit 510 and executable by processor unit 605. In some cases, user interface 615 is implemented as a graphical user interface. In some cases, image generation apparatus 600 provides user interface 615 on a user device (such as the user device described with reference to FIG. 1).

According to some aspects, user interface 615 obtains an input image and a local content preservation value. In some examples, user interface 615 receives a content generation selection, where the content generation selection applies the local content preservation value to at lease one pixel of the input image. In some examples, user interface 615 obtains a text prompt, where an output image is generated based on the text prompt.

In some examples, user interface 615 displays the preview of each of the set of variations of the output image to a user. In some examples, user interface 615 receives the selection input indicating the output image from among the set of variations. In some examples, user interface 615 displays the content generation selection overlay depicting the content generation selection overlapping the input image, where the transparency value of the content generation selection overlay is based on the local content preservation value.

According to some aspects, image generation model 620 is implemented as software stored in memory unit 610 and executable by processor unit 605, as firmware, as one or more hardware circuits, or as a combination thereof. According to some aspects, image generation model 620 comprises machine learning parameters stored in memory unit 610.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, that control a strength of connections between neurons and influence the neural network's ability to capture complex patterns in data.

According to some aspects, image generation model 620 comprises one or more ANNs. An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, image generation model 620 comprises one or more ANNs configured, designed, and/or trained to an generate an output image based on the input image and the content generation selection, where the output image includes synthetic content in a region specified by the content generation selection, and where a degree of adherence of the synthetic content to the input image is based on the local content preservation value. For example, in some cases, image generation model 620 comprises one or more of a convolutional neural network (CNN), a variational autoencoder (VAE), a generative adversarial network (GAN), a diffusion model, or any other suitable ANN.

A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

A VAE is an ANN that learns to encode and decode images. In some cases, a VAE comprises an encoder network that maps an input image to a lower-dimensional latent space and a decoder network that generates a new image from the latent space representation. A VAE can generate different images by sampling different points in the latent space.

A GAN is class of ANN in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The training objective of the generator is to increase an error rate of the discriminator by producing novel candidates that the discriminator classifies as "real" (e.g., belonging to the true data distribution). Therefore, given a training set, the GAN learns to generate new data with similar properties as the training set.

A GAN may be trained via supervised learning, semi-supervised learning, unsupervised learning, or reinforcement learning. In some cases, a GAN can be guided by a prompt (such as a text prompt) such that the output of the GAN includes, to some degree, content indicated by the prompt. In some cases, a GAN can be guided by a mask (such as a mask based on a user input such as a content generation selection) such that the mask influences an appearance (for example, based on values provided by various user inputs as described herein) of the output of the GAN in a region corresponding to the mask.

A diffusion model is a class of ANN that is trained to generate an image by learning an underlying probability distribution of the training data that allows the model to iteratively refine the generated image using a series of diffusion steps. In some cases, a reverse diffusion process of the diffusion model starts with a noise vector or a randomly initialized image. In each diffusion step of the reverse diffusion process, the model applies a sequence of transformations (such as convolutions, up-sampling, down-sampling, and non-linear activations) to the image, gradually "diffusing" the original noise or image to resemble a real sample.

During the reverse diffusion process, the diffusion model estimates the conditional distribution of the next image given the current image (for example, using a CNN or a similar architecture). In some cases, a reverse diffusion process can be guided by a prompt (such as a text prompt) such that the output of the reverse diffusion process includes, to some degree, content indicated by the prompt. In some cases, a reverse diffusion process can be guided by a mask (such as a mask based on a user input such as a content generation selection) such that the mask influences an appearance (for example, based on values provided by various user inputs as described herein) of the output of the reverse diffusion process in a region corresponding to the mask.

In some examples, image generation model 620 generates a set of variations of the output image.

Figure 7:
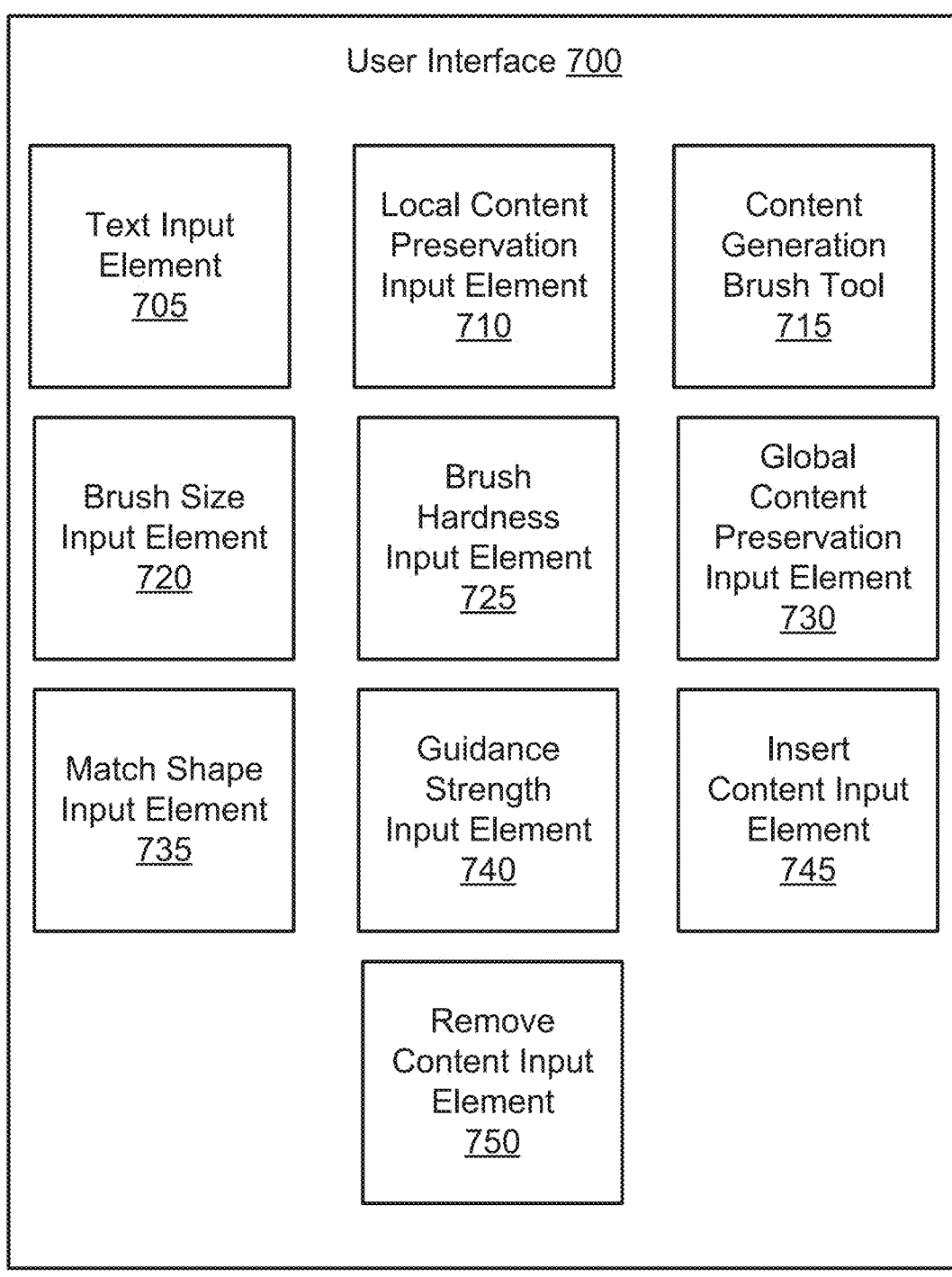
FIG. 7 shows an example of a user interface according to aspects of the present disclosure.

FIG. 7 shows an example of a user interface 700 according to aspects of the present disclosure. User interface 700 is an example of, or includes aspects of, the corresponding element described with reference to FIGS. 3-6.

In one aspect, user interface 700 includes text input element 705, local content preservation input element 710, content generation brush tool 715, brush size input element 720, brush hardness input element 725, global content preservation input element 730, match shape input element 735, guidance strength input element 740, insert content input element 745, and remove content input element 750. In one aspect, user interface 700 displays text input element 705, local content preservation input element 710, content generation brush tool 715, brush size input element 720, brush hardness input element 725, global content preservation input element 730, match shape input element 735, guidance strength input element 740, insert content input element 745, remove content input element 750, or a combination thereof.

According to some aspects, text input element 705 is configured to receive a text prompt. Text input element 705 is an example of, or includes aspects of, the corresponding element described with reference to FIGS. 3-5.

According to some aspects, local content preservation input element 710 is configured to receive a local content preservation value from a user. In some aspects, the local content preservation input element 710 is further configured to receive an additional local content preservation value from the user. Local content preservation input element 710 is an example of, or includes aspects of, the corresponding element described with reference to FIG. 3.

According to some aspects, content generation brush tool 715 is configured to receive a content generation selection from the user, wherein the content generation selection applies the local content preservation value to at least one pixel of an input image. In some aspects, the content generation brush tool is further configured to receive an additional content generation selection from the user, where the additional content generation selection applies the additional local content preservation value to at least one additional pixel of the input image, and where the output image is further based on the additional content generation selection.

According to some aspects, brush size input element 720 is configured to receive a brush size input, wherein the content generation selection is based at least in part on the brush size input. Brush size input element 720 is an example of, or includes aspects of, the corresponding element described with reference to FIGS. 3 and 5.

According to some aspects, brush hardness input element 725 is configured to receive a brush hardness input, wherein the content generation selection is based at least in part on the brush hardness input. Brush hardness input element 725 is an example of, or includes aspects of, the corresponding element described with reference to FIGS. 3 and 5.

According to some aspects, global content preservation input element 730 is configured to receive a global content preservation value, wherein the output image is further based on the global content preservation value. Global content preservation input element 730 is an example of, or includes aspects of, the corresponding element described with reference to FIG. 5.

According to some aspects, match shape input element 735 is configured to receive a match shape input, wherein a closeness of a match between the synthetic content of the output image and the content generation selection 550 output image is based on the match shape input. Match shape input element 735 is an example of, or includes aspects of, the corresponding element described with reference to FIG. 5.

According to some aspects, guidance strength input element 740 is configured to receive a guidance strength input, wherein a closeness of a match between the synthetic content of the output image and the text prompt is based on the guidance strength input. Guidance strength input element 740 is an example of, or includes aspects of, the corresponding element described with reference to FIG. 5.

According to some aspects, insert content input element 745 is configured to receive an insert content input, wherein the output image is based on the insert content input. Insert content input element 745 is an example of, or includes aspects of, the corresponding element described with reference to FIGS. 3 and 5.

According to some aspects, remove content input element 750 is configured to receive a remove content input, where the output image is based on the remove content input. Remove content input element 750 is an example of, or includes aspects of, the corresponding element described with reference to FIGS. 3 and 5.

Image Generation

A method for image generation is described with reference to FIG. 8. One or more aspects of the method include obtaining, via a user interface, an input image and a local content preservation value; receiving a content generation selection, wherein the content generation selection applies the local content preservation value to at least one pixel of the input image; and generating, using an image generation model, an output image based on the input image and the content generation selection, wherein the output image includes synthetic content in a region specified by the content generation selection, and wherein a degree of adherence of the synthetic content to the input image is based on the local content preservation value.

Some examples of the method further include obtaining a text prompt, wherein the output image is generated based on the text prompt. Some examples of the method further include receiving a brush size input, wherein the content generation selection is based at least in part on the brush size input. Some examples of the method further include receiving a brush hardness input, wherein the content generation selection is based at least in part on the brush hardness input.

Some examples of the method further include receiving an additional local content preservation value from the user. Some examples further include receiving an additional content generation selection from the user, wherein the additional content generation selection applies the additional local content preservation value to at least one additional pixel of the input image, and wherein the output image is further based on the additional content generation selection.

Some examples of the method further include receiving a global content preservation value, wherein the output image is further based on the global content preservation value. Some examples of the method further include combining the local content preservation value and the global content preservation value to obtain a combined content preservation value for the at least one pixel, wherein the output image is based on the combined content preservation value.

Some examples of the method further include receiving a match shape input, wherein a closeness of a match between the synthetic content of the output image and the content generation selection is based on the match shape input. Some examples of the method further include receiving a guidance strength input, wherein a closeness of a match between the synthetic content of the output image and the text prompt is based on the guidance strength input.

Some examples of the method further include receiving an insert content input, wherein the output image is based on the insert content input. Some examples of the method further include receiving a remove content input, wherein the output image is based on the remove content input. Some examples of the method further include saving the content generation selection as metadata in an image layer of the output image.

Some examples of the method further include generating a plurality of variations of the output image. Some examples further include displaying a preview of each of the plurality of variations of the output image to the user. Some examples further include receiving a selection input indicating the output image from among the plurality of variations.

Some examples of the method further include displaying a content generation selection overlay depicting the content generation selection overlapping the input image, wherein a transparency value of the content generation selection overlay is based on the local content preservation value. Some examples of the method further include displaying the output image including the synthetic content at the location of the content generation selection.

A method for image generation is described with reference to FIG. 8. One or more aspects of the method include obtaining an input image; receiving a text prompt; receiving a local content preservation value from a user; receiving a content generation selection from the user, wherein the content generation selection applies the local content preservation value to at least one pixel of the input image; and generating, using an image generation model guided by the text prompt, an output image based on the input image, wherein the output image includes content based on the text prompt in a region specified by the content generation selection, and wherein a degree of adherence of the content to the input image is based on the local content preservation value. Some examples of the method further include saving the content generation selection as metadata in an image layer of the output image. Some examples further include displaying the output image including the synthetic content at the location of the content generation selection.

FIG. 8 shows an example of a method 800 for generating an image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, a method for image generation includes generating an output image using an inpainting technique, where an image generation model inpaints content (for example, content described by a text prompt) in a region of an input image identified by a content generation selection (for example, using a brush tool input). In some cases, the image generation model preserves an amount of content from the input image, specified by a local content preservation value, in the area identified by the content generation selection such that the inpainted content (e.g., synthetic content) is naturally integrated with the input image in the output image.

At operation 805, the system obtains, via a user interface, an input image and a local content preservation value. In some cases, the operations of this step refer to, or may be performed by, a user interface as described with reference to FIGS. 3-7.

In some cases, the user interface is provided by an image generation apparatus (such as the image generation apparatus described with reference to FIGS. 1 and 6) on a user device (such as the user device described with reference to FIG. 1). In some cases, the user interface receives the input image from a user (such as the user described with reference to FIG. 1) of the user device.

In some cases, the image generation apparatus retrieves the input image from a database (such as the database described with reference to FIG. 1) or from another data source (such as the Internet). In some cases, the image generation apparatus retrieves the input image in response to a user query for the input image. In some cases, the image generation apparatus displays the input image via the user interface.

In some cases, a local content preservation element displayed by the user interface receives the local content preservation value. In some cases, the local content preservation value identifies an amount of content depicted in the input image in an area corresponding to a content generation selection to be retained in the generated output image. In some cases, the local content preservation value corresponds to a weight of an input (such as a text prompt, an image prompt, etc.) in an image generation process, such that the generated output image is generated using an image generation process that is influenced according to the weight of the input. For example, in some cases, a high local content preservation value corresponds to a low weight of the input, and the image generation process accordingly generates an output image that is influenced by the input to a lesser degree than the input image.

In some cases, the local content preservation value corresponds to a transparency of a mask provided by the content generation selection. For example, a mask including different local content preservation values associated with different pixels of the input image may be used as an input for the image generation model. An indication of the mask may be displayed to the user using a transparency value to indicate the local content preservation value at each pixel of the mask.

In some cases, a text input element displayed by the user interface (such as the text input element described with reference to FIGS. 3-5 and 7) obtains a text prompt. In some cases, the user provides the text prompt to the text input element. In some cases, the text prompt describes content to be generated in a generated output image. In some cases, the user provides an image prompt to an image prompt element displayed by the user interface. In some cases, the image prompt visually depicts content to be generated in a generated output image. In some cases, the user provides a prompt in a non-image and non-text modality to a prompt element displayed by the user interface, where the prompt describes the content to be generated in the generated output image.

At operation 810, the system receives a content generation selection from the user, where the content generation selection applies the local content preservation value to at least one pixel of the input image. In some cases, the operations of this step refer to, or may be performed by, a user interface as described with reference to FIGS. 3-7. For example, in some cases, the user provides the content generation selection to the input image using a content generation brush tool (such as the content generation brush tool described with reference to FIG. 7) displayed by the user interface. In some cases, the image generation apparatus associates each pixel of the input image that the content generation selection is applied to with the local content preservation value.

In some cases, the local content preservation input element receives an additional local content preservation value from the user. In some cases, the content generation brush tool receives an additional content generation selection from the user, where the additional content generation selection applies the additional local content preservation value to at least one additional pixel of the input image.

In some cases, the user interface displays a content generation selection overlay depicting the content generation selection, the additional content generation selection, or a combination thereof overlapping the input image, where a transparency value of the content generation selection overlay and/or the additional content generation selection is based on the local content preservation value or the additional local content preservation value, respectively. In some cases, the content generation selection provides a mask for masking a region of the input image. In some cases, the additional content generation selection provides an additional mask for masking an additional region of the input image.

In some cases, a brush size input element displayed by the user interface (such as the brush size element described with reference to FIGS. 3, 5, and 7) receives a brush size input (for example, from the user), where the content generation selection is based at least in part on the brush size input. For example, in some cases, the brush size input controls a pixel size of the content generation brush tool.

In some cases, a brush hardness input element displayed by the user interface (such as the brush hardness input element described with reference to FIGS. 3, 5, and 7) receives a brush hardness input, where the content generation selection is based at least in part on the brush hardness input. For example, in some cases, the brush hardness input determines a hardness of the mask. In some cases, the hardness of the mask corresponds to a number of bands of differing transparencies included in the mask, where a hard mask includes less bands and a soft mask includes more bands. In some cases, each band corresponds to a different local content preservation value. Therefore, in some cases, the user can quickly and intuitively create gradations of degrees to which content in the output image corresponds to the input image, thereby allowing a user to intuitively and efficiently control content blending in the output image.

In some cases, a global content preservation input element (such as the global content preservation input element described with reference to FIGS. 5 and 7) receives a global content preservation value. In some cases, the global content preservation value is applied to each pixel associated with a content generation selection, and is a baseline content preservation value, such that each local content preservation value is equal to or different than (e.g., less than or greater than) the global content preservation value. In some cases, a local content preservation value is outside of a range of the global content preservation value, and the local content preservation value is overridden and set to be equal to the global content preservation value.

In some cases, the image generation apparatus combines the local content preservation value and the global content preservation value to obtain a combined content preservation value for the at least one pixel.

In some cases, a match shape input element displayed by the user interface (such as the match shape input element described with reference to FIGS. 5 and 7) receives a match shape input. In some cases, the match shape input determines how closely a boundary of synthetic content in the generated image matches a boundary of the content generation selection.

In some cases, a guidance strength input element displayed by the user interface (such as the guidance strength input element described with reference to FIGS. 5 and 7) receives a guidance strength input. In some cases, the guidance strength input determines how closely synthetic content keeps to the prompt. In some cases, the guidance strength determines how closely synthetic content included in an output image matches content described in a prompt.

At operation 815, the system generates an output image based on the input image and the content generation selection, wherein the output image includes synthetic content in a region specified by the content generation selection, and wherein a degree of adherence of the synthetic content to the input image is based on the local content preservation value. In some cases, the operations of this step refer to, or may be performed by, an image generation model as described with reference to FIG. 6.

For example, in some cases, the image generation model uses an image generation process implemented by a diffusion model, a GAN, a VAE, or other suitable image generation model, where content in an area of the input image corresponding to the content generation selection is inpainted with the synthetic content to produce the output image. In some cases, the text prompt, the image prompt, or other prompt is used as guidance in the image generation process, such that the synthetic content depicts content described by the text prompt, the image prompt, or other prompt to a variable degree corresponding to the local content preservation value.

In some cases, the image generation process is based on one or more additional values derived from one or more additional inputs. For example, in some cases, the output image is further based on the additional content generation selection. In some cases, the output image is further based on the global content preservation value. In some cases, the output image is based on the combined content preservation value. In some cases, a closeness of a match between the synthetic content of the output image and the content generation selection is based on the match shape input. In some cases, a closeness of a match between the synthetic content of the output image and the text prompt is based on the guidance strength input.

In some cases, an insert content input element receives an insert content input, such that the image generation apparatus generates the output image by inserting content into the input image. In some cases, a remove content input element receives a remove content input, such that the image generation apparatus generates the output image by removing content from the input image.

In some cases, the image generation apparatus saves the content generation selection as metadata in an image layer of the output image. In some cases, the image generation model generates a set of variations of the output image. In some cases, the user interface displays a preview of each of the set of variations of the output image to the user. In some cases, the user interface receives a selection input indicating the output image from among the plurality of variations.

FIG. 9 shows an example of a computing device 900 for multi-modal image editing according to aspects of the present disclosure. According to some aspects, computing device 900 includes processor(s) 905, memory subsystem 910, communication interface 915, I/O interface 920, user interface component(s) 925, and channel 930.

In some embodiments, computing device 900 is an example of, or includes aspects of, the image generation apparatus described with reference to FIGS. 1 and 6. In some embodiments, computing device 900 includes one or more processors 905 that can execute instructions stored in memory subsystem 910 to obtain, via a user interface, an input image and a local content preservation value; receive a content generation selection, wherein the content generation selection applies the local content preservation value to at least one pixel of the input image; and generate, using an image generation model, an output image based on the input image and the content generation selection, wherein the output image includes synthetic content in a region specified by the content generation selection, and wherein a degree of adherence of the synthetic content to the input image is based on the local content preservation value.

According to some aspects, computing device 900 includes one or more processors 905. Processor(s) 905 are an example of, or includes aspects of, the processor unit as described with reference to FIG. 6. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 910 includes one or more memory devices. Memory subsystem 910 is an example of, or includes aspects of, the memory unit as described with reference to FIG. 6. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 915 operates at a boundary between communicating entities (such as computing device 900, one or more user devices, a cloud, and one or more databases) and channel 930 and can record and process communications. In some cases, communication interface 915 is provided to enable a processing system coupled to a transceiver (e.g., a transmitter and/or a receiver). In some examples, the transceiver is configured to transmit (or send) and receive signals for a communications device via an antenna.

According to some aspects, I/O interface 920 is controlled by an I/O controller to manage input and output signals for computing device 900. In some cases, I/O interface 920 manages peripherals not integrated into computing device 900. In some cases, I/O interface 920 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 920 or via hardware components controlled by the I/O controller.

According to some aspects, user interface component(s) 925 enable a user to interact with computing device 900. In some cases, user interface component(s) 925 include an audio device, such as an external speaker system, an external display device such as a display screen, an input device (e.g., a remote control device interfaced with a user interface directly or through the I/O controller), or a combination thereof. In some cases, user interface component(s) 925 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:
obtaining, via a user interface, a text prompt, an input image, and a local content preservation value;
receiving a content generation selection, wherein the content generation selection applies the local content preservation value to at least one pixel of the input image; and
generating, using an image generation process guided by the text prompt and performed by an image generation model, an output image based on the input image and the content generation selection, wherein the output image includes synthetic content in a region specified by the content generation selection, and wherein a weight of an effect of the text prompt on the image generation process corresponds to the local content preservation value.

2. The method of claim 1, further comprising:
receiving, via a brush size input element, a brush size input, wherein the content generation selection is based at least in part on the brush size input.

3. The method of claim 1, further comprising:
receiving, via a brush hardness input element, a brush hardness input, wherein the content generation selection is based at least in part on the brush hardness input.

4. The method of claim 1, further comprising:
receiving, via a local content preservation input element, an additional local content preservation value from a user; and
receiving an additional content generation selection from the user, wherein the additional content generation selection applies the additional local content preservation value to at least one additional pixel of the input image, and wherein the output image is further based on the additional content generation selection.

5. The method of claim 1, further comprising:
receiving, via a global content preservation input element, a global content preservation value, wherein the output image is further based on the global content preservation value.

6. The method of claim 5, further comprising:
combining the local content preservation value and the global content preservation value to obtain a combined content preservation value for the at least one pixel, wherein the output image is based on the combined content preservation value.

7. The method of claim 1, further comprising:
receiving, via a match shape input element, a match shape input, wherein a closeness of a match between the synthetic content of the output image and the content generation selection is based on the match shape input.

8. The method of claim 1, further comprising:
receiving, via a guidance strength input element, a guidance strength input, wherein a closeness of a match between the synthetic content of the output image and the text prompt is based on the guidance strength input.

9. The method of claim 1, further comprising:

receiving, via an insert content input element, an insert content input, wherein the output image is based on the insert content input.

10. The method of claim 1, further comprising:

receiving, via a remove content input element, a remove content input, wherein the output image is based on the remove content input.

11. The method of claim 1, further comprising:

saving the content generation selection as metadata in an image layer of the output image.

12. The method of claim 1, further comprising:

generating a plurality of variations of the output image;

displaying a preview of each of the plurality of variations of the output image; and receiving a selection input indicating the output image from among the plurality of variations.

13. The method of claim 1, further comprising:

displaying a content generation selection overlay depicting the content generation selection overlapping the input image, wherein a transparency value of the content generation selection overlay is based on the local content preservation value.

14. The method of claim 1, further comprising:

displaying the output image including the synthetic content at a location of the content generation selection.

15. A non-transitory computer readable medium storing instructions that, when executed by a processor, cause the processor to:

obtain an input image;

receive, via text input element, a text prompt;

receive, via a local content preservation input element, a local content preservation value from a user;

receive, via a content generation brush tool, a content generation selection from the user, wherein the content generation selection applies the local content preservation value to at least one pixel of the input image; and generate, using an image generation process guided by the text prompt and performed by an image generation model, an output image based on the input image, wherein the output image includes content based on the text prompt in a region specified by the content generation selection, and wherein a weight of an effect of the text prompt on the image generation process corresponds to the local content preservation value.

16. A system for image generation, comprising:

one or more processors;

one or more memory components coupled with the one or more processors;

a user interface displaying:

a text input element configured to receive a text prompt, a local content preservation input element configured to receive a local content preservation value from a user, and a content generation brush tool configured to receive a content generation selection from the user, wherein the content generation selection applies the local content preservation value to at least one pixel of an input image; and an image generation model configured to perform an image generation process to generate an output image based on the input image, wherein the output image includes content based on the text prompt in a region specified by the content generation selection, and wherein a weight of an effect of the text prompt on the image generation process corresponds to the local content preservation value.

17. The system of claim 16, the user interface further displaying:

a brush size input element configured to receive a brush size input, wherein the content generation selection is based at least in part on the brush size input.

18. The system of claim 16, the user interface further displaying:

a brush hardness input element configured to receive a brush hardness input, wherein the content generation selection is based at least in part on the brush hardness input.

19. The system of claim 16, wherein:

the local content preservation input element is further configured to receive an additional local content preservation value from the user; and the content generation brush tool is further configured to receive an additional content generation selection from the user, wherein the additional content generation selection applies the additional local content preservation value to at least one additional pixel of the input image, and wherein the output image is further based on the additional content generation selection.

* * * * *